(12) United States Patent
Lim et al.

(10) Patent No.: US 9,635,531 B2
(45) Date of Patent: Apr. 25, 2017

(54) METHOD AND SYSTEM FOR TRANSMITTING MEDIA PREFERENCE INFORMATION WITH RESPECT TO EMERGENCY CALL IN MOBILE COMMUNICATION SYSTEM

(71) Applicant: Samsung Electronics Co., Ltd., Suwon-si, Gyeonggi-do (KR)

(72) Inventors: Han Na Lim, Seoul (KR); Sang Soo Jeong, Suwon-si (KR); Song Yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 14/355,437

(22) PCT Filed: Nov. 2, 2012

(86) PCT No.: PCT/KR2012/009154
§ 371 (c)(1),
(2) Date: Apr. 30, 2014

(87) PCT Pub. No.: WO2013/066093
PCT Pub. Date: May 10, 2013

(65) Prior Publication Data
US 2014/0293838 A1 Oct. 2, 2014

(30) Foreign Application Priority Data
Nov. 2, 2011 (KR) ........................ 10-2011-0113470

(51) Int. Cl.
*H04W 4/22* (2009.01)
*H04W 76/00* (2009.01)
*H04W 8/18* (2009.01)

(52) U.S. Cl.
CPC ........... *H04W 4/22* (2013.01); *H04W 76/007* (2013.01); *H04W 8/18* (2013.01)

(58) Field of Classification Search
CPC ...................................................... H04W 4/22
See application file for complete search history.

(56) References Cited

U.S. PATENT DOCUMENTS

2010/0255808 A1* 10/2010 Guo .................... H04W 76/007
455/404.1
2010/0296634 A1* 11/2010 Schulzrinne ......... H04M 3/5116
379/45

(Continued)

FOREIGN PATENT DOCUMENTS

JP           2000-324532 A     11/2000
KR     10-2004-0043340 A      5/2004

(Continued)

OTHER PUBLICATIONS

3GPP, 3rd Generation Partnership Project; Technical Specification Group Services and System Aspects; IP Mulitmedia Subsystem (IMS) emergency sessions (Release 9), 3GPP TS 23.167, Sep. 2011, V9.7.0, Sophia Antipolis, France.

(Continued)

*Primary Examiner* — Chi H Pham
*Assistant Examiner* — Kevin Lee
(74) *Attorney, Agent, or Firm* — Jefferson IP Law, LLP (57) ABSTRACT

The present disclosure relates to a method and system for transmitting media preference information related to an emergency call in a mobile communication system. The method for transmitting media preference information associated with an emergency call may include: sending, by a user equipment (UE), an emergency call request message containing media preference information of a user associated with an emergency call to the Proxy Call Session Control Function (P-CSCF); sending, by the P-CSCF, appli- (Continued)

cation service information containing the media preference information to the Policy and Charging Rule Function (PCRF); and determining, by the PCRF, a policy to be used for controlling the UE on the basis of the media preference information.

17 Claims, 8 Drawing Sheets

(56) References Cited

U.S. PATENT DOCUMENTS

2011/0171924 A1 7/2011 Faccin et al.
2014/0301248 A1* 10/2014 Lindholm ............... H04L 69/24
370/259

FOREIGN PATENT DOCUMENTS

| KR | 10-2007-0062195 A | 6/2007 |
|---|---|---|
| WO | 2010-141882 A2 | 12/2010 |

OTHER PUBLICATIONS

3GPP, 3rd Generation Partnership Project; Technical Specification Group Core Network and Terminals; Telecommunications and Internet Converged Services and Protocols for Advanced Networking (TISPAN); IP Mulitmedia Call Control Protocol based on Session Initiation Protocol (SIP) and Session Description Protocol (SDP) Stage 3, [3GPP Ts 24.299 [Release 7], modified], 3GPP TS 24.503, Mar. 2011, V8.10.0, Sophia Antipolis, France.

3GPP, 3rd Generation Partnership Project; Technical Specification Group Core Network and Terminals; Policy and Charging Control Over Rx Reference Point (Release 9), 3GPP TS 29.214, Sep. 2011, V9.8.0, Sophia Antipolis, France.

3GPP, 3rd Generation Partnership Project; Technical Specification Group Services and System Aspects; General Packet Radio Service (GPRS) Enhancements for Evolved Universal Terrestrial Radio Access Network (E-UTRAN) access (Release 9), 3GPP TS 23.401, Sep. 2011, V9.10.0, Sophia Antipolis, France.

* cited by examiner

```
INVITE urn:service:sos.fire SIP/2.0
Via: SIP/2.0/UDP [5555::aaa:bbb:ccc:ddd]:1357;comp=sigcomp;branch=z9hG4bKnashds7
Max-Forwards: 70
Route: <sip:pcscf.visit1.net:7531;lr;comp=sigcomp>
P-Preferred-Identity: <sip:user1_public1@home1.net>
P-Access-Network-Info: 3GPP-UTRAN-FDD; utran-cell-id-3gpp=234151D0FCE11
Privacy: none
From: <sip:user1_public1@home1.net>;tag=171828
To: <urn:service:sos.fire>
Call-ID: cb03a0s09a2sdfglkj490333
Cseq: 127 INVITE
Supported: 100rel, precondition, 199, gruu
Accept: application/sdp,application/3gpp-ims+xml
Require: sec-agree                    [presented as a Tag]
Proxy-Require: sec-agree
Security-Verify: ipsec-3gpp; q=0.1; alg=hmac-sha-1-96; spi=87654321; port=7531
Contact: <sip:user1_public1@home1.net;gr=urn:uuid:f81d4fae-7dec-11d0-a765-00a0c91e6bf6>
         ;preferred-media=video
Geolocation:              <sips:3sdefrhy2jj7@lis.atlanta.example.com>;inserted-
by="sip:user1_public1@home1.net";routing-allowed="yes"
Allow: INVITE, ACK, CANCEL, BYE, PRACK, UPDATE, REFER, MESSAGE
Preferred-Media: video
Content-Type: application/sdp         [presented as a Header]
Content-Length: [...]
```

```
v=0
o=- 2987933615 2987933615 IN IP6 5555::aaa:bbb:ccc:ddd
s=-
c=IN IP6 5555::aaa:bbb:ccc:ddd
t=0 0
m=video 3400 RTP/AVP 98 99
b=AS:75
a=curr:qos local none
a=curr:qos remote none
a=des:qos mandatory local sendrecv
a=des:qos none remote sendrecv
a=rtpmap:98 H263
a=fmtp:98 profile-level-id=0
a=rtpmap:99 MP4V-ES m=audio 3456 RTP/AVP 97 96
b=AS:25.4
a=curr:qos local none
a=curr:qos remote none
a=des:qos mandatory local sendrecv
a=des:qos none remote sendrecv
a=rtpmap:97 AMR
a=fmtp:97 mode-set=0,2,5,7; mode-change-period=2
a=rtpmap:96 telephone-event
a=maxptime:20
```

| Octets 1 | Bearer Context IE Type = 93 (decimal) | | | |
| Octets 2 and 3 | Length = n | | | |
| Octets 4 | Spare and Instance fields | | | |
| Information elements | P | Condition / Comment | IE Type | Ins. |
|---|---|---|---|---|
| EPS Bearer ID | M | This IE shall be set to 0. | IE Type | 0 |
| TFT | M | This IE can contain both uplink and downlink packet filters to be sent to the UE or the ePDG. Downlink packet filters are also used by SGW for PMIP based S5/8 interfaces | Bearer TFT | 0 |
| S1-U SGW F-TEID | C | This IE shall be sent on the S11 interface if the S1-U interface is used. | F-TEID | 0 |
| S5/8-U PGW F-TEID | C | This IE shall be sent on the S4, S5/S8 and S11 interfaces for GTP-based S5/S8 interface. The MME/SGSN shall ignore the IE on S11/S4 for PMIP-based S5/S8 interface. | F-TEID | 1 |
| S12 SGW F-TEID | C | This IE shall be sent on the S4 interface if the S12 interface is used. | F-TEID | 2 |
| S4-U SGW F-TEID | C | This IE shall be sent on the S4 interface if the S12 interface is used. | F-TEID | 3 |
| S2b-U PGW F-TEID | C | This IE (for user plane) shall be sent on the S2b interface. | F-TEID | 4 |
| Bearer Level QoS | M | This IE shall be sent on the S5/S8 interface. | Bearer QoS | 0 |
| Charging Id | C | If the S5/S8 interface is GTP, this IE may be sent on the S4 interface, in order to support CAMEL charging at the SGSN. | Charging Id | 0 |
| Bearer Flags | O | Applicable flags are:<br>- PPC (Prohibit Payload Compression): this flag may be set on the S5/S8 and S4/S11 interfaces | Bearer Flags | 0 |
| Protocol Configuration Options (PCO) | O | This IE may be sent on the S5/S8 and S4/S11 interfaces. This bearer level IE takes precedence over the PCO IE in the message body if they both exist. | PCO | 0 |

FIG. 8

| Octets 1 | Bearer Context IE Type = 93 (decimal) | | | |
|---|---|---|---|---|
| Octets 2 and 3 | Length = n | | | |
| Octets 4 | Spare and Instance fields | | | |
| Information elements | Condition / Comment | P | IE Type | Ins. |
| EPS Bearer ID | This IE shall be set to 0. | M | EBI | 0 |
| TFT | This IE can contain both uplink and downlink packet filters to be sent to the UE or the ePDG. Downlink packet filters are also used by SGW for PMIP based S5/8 interfaces. | M | Bearer TFT | 0 |
| S1-U SGW F-TEID | This IE shall be sent on the S11 interface if the S1-U interface is used. | C | F-TEID | 0 |
| S5/8-U PGW F-TEID | This IE shall be sent on the S4, S5/S8 and S11 interfaces for GTP-based S5/S8 interface. The MME/SGSN shall ignore the IE on S11/S4 for PMIP-based S5/S8 interface. | C | F-TEID | 1 |
| S12 SGW F-TEID | This IE shall be sent on the S4 interface if the S12 interface is used. | C | F-TEID | 2 |
| S4-U SGW F-TEID | This IE shall be sent on the S4 interface if the S4-U interface is used. | C | F-TEID | 3 |
| S2b-U PGW F-TEID | This IE (for user plane) shall be sent on the S2b interface. | C | F-TEID | 4 |
| Bearer Level QoS | | M | Bearer QoS | 0 |
| Charging Id | This IE shall be sent on the S5/S8 interface. If the S5/S8 interface is GTP, this IE may be sent on the S4 interface, in order to support CAMEL charging at the SGSN. | C O | Charging Id | 0 |
| Bearer Flags | Applicable flags are:<br>- PPC (Prohibit Payload Compression): this flag may be set on the S5/S8 and S4/S11 interfaces | O | Bearer Flags | 0 |
| Protocol Configuration Options (PCO) | This IE may be sent on the S5/S8 and S4/S11 interfaces. This bearer level IE takes precedence over the PCO IE in the message body if they both exist. | O | PCO | 0 |
| Emergency media preference | Emergency bearer media priority information | | Emergency media preference | |

METHOD AND SYSTEM FOR TRANSMITTING MEDIA PREFERENCE INFORMATION WITH RESPECT TO EMERGENCY CALL IN MOBILE COMMUNICATION SYSTEM

TECHNICAL FIELD

The present disclosure relates to a mobile communication system. More particularly, the present disclosure relates to a method and system that transmit user media preference information related to an emergency call to a network and enable the network to utilize the user media preference information.

BACKGROUND ART

Typical mobile communication systems have been developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

In existing mobile communication systems, only voice calls have been used as emergency calls. However, advances in packet networks and enormous popularization of smartphones have necessitated introduction of Non-Voice Emergency Services (NOVES) that enable a user equipment to place an emergency call with media other than, or in addition to, voice (NOVES call) in an emergency situation. For example, a user may desire to send a video clip showing the emergency situation to an emergency center or may desire to perform text communication with an emergency center if use of voice communication is difficult. In the present disclosure, a NOVES call may be a call with voice and other media or a call with media other than voice.

When a radio access technology (RAT) is changed owing to movement of a user equipment processing a NOVES call, the target network may support only a portion of media currently used by the user equipment. In this case, the network may have to select a portion of media to be transferred to the target network according to media preference information of the user. This is because preferred media may be different according to situations of the user. For example, the user may prefer video over voice in some cases.

For a normal call, media to be transferred to the target network may be selected on the basis of user preferences stored in the subscription data or operator policies. However, as an emergency call is a non-subscription service, the network cannot be aware of media preference information of a user. In addition, as user media preference information may change at each attempt to make an emergency call, it may be inflexible for the network to store user media preference as static information for later usage.

DISCLOSURE OF INVENTION

Technical Problem

Aspects of the present disclosure are to address at least the above mentioned problems. Accordingly, an aspect of the present disclosure is to provide a method and system that transfer, to take user preference information into account during packet-switched (PS) handover of an emergency call, user media preference information related to the emergency call to the network.

Another aspect of the present disclosure is to provide a method and system that enable the network to utilize user media preference information.

Solution to Problem

In accordance with an aspect of the present disclosure, a method for transmitting media preference information associated with an emergency call in a mobile communication system is provided. The method may include: sending, by a user equipment (UE), an emergency call request message containing media preference information of a user associated with an emergency call to a Proxy Call Session Control Function (P-CSCF); sending, by the P-CSCF, application service information containing the media preference information to a Policy and Charging Rule Function (PCRF); and determining, by the PCRF, a policy to be used for controlling the UE on the basis of the media preference information.

In a handover method for a UE, the MME may control handover for an emergency call by use of the policy.

In accordance with another aspect of the present disclosure, a system for transmitting media preference information associated with an emergency call in a mobile communication system is provided. The system may include: a user equipment (UE) configured to send an emergency call request message containing media preference information of a user associated with an emergency call; a P-CSCF configured to receive the emergency call request message from the UE and send application service information containing the media preference information; a PCRF configured to receive the application service information from the P-CSCF and determine a policy to be used for controlling the UE on the basis of the media preference information; and an MME configured to control handover of the UE on the basis of the determined policy.

Advantageous Effects of Invention

In a feature of the present disclosure, user media preference information for an emergency call can be delivered to the network. Hence, when a radio access technology (RAT) is changed owing to movement of a user equipment, although the target network may support only a portion of media currently used by the user equipment, the portion of media to be transferred to the target network may be selected according to user media preference information.

BRIEF DESCRIPTION OF DRAWINGS

FIG. 8 illustrates fields constituting a bearer context according to another embodiment of the present disclosure.

MODE FOR THE INVENTION

Hereinafter, embodiments of the present disclosure are described in detail with reference to the accompanying drawings. The same reference symbols are used throughout the drawings to refer to the same or like parts. Detailed descriptions of well-known functions and structures incorporated herein may be omitted to avoid obscuring the subject matter of the present disclosure.

Figure 1:
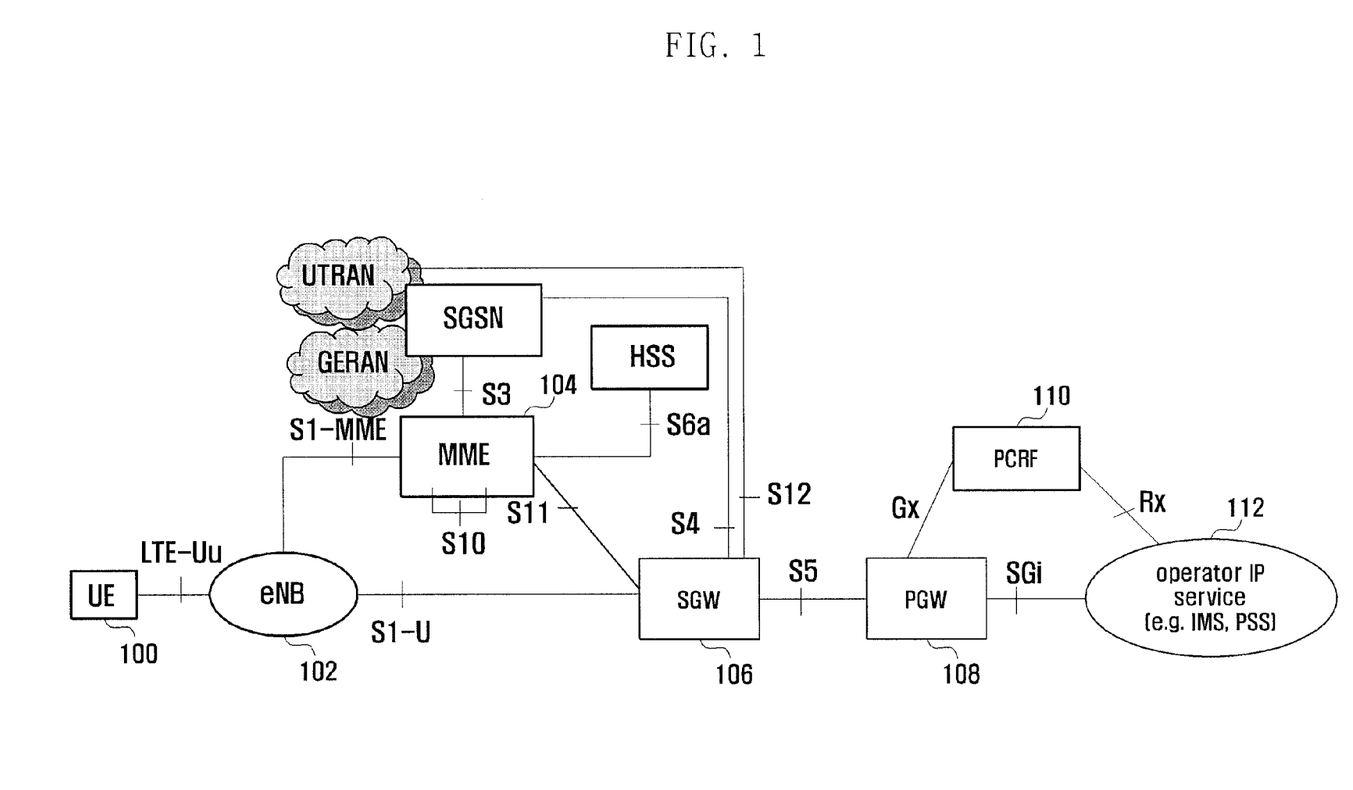
FIG. 1 illustrates the architecture of a mobile communication system, i.e. Evolved Packet System (EPC), on which embodiments of the present disclosure are based.

FIG. 1 illustrates the architecture of a mobile communication system, i.e. Evolved Packet System (EPC), on which embodiments of the present disclosure are based. Among entities of the EPC, only entities related to the present disclosure are described below.

A user equipment (UE) 100 may connect to the core network EPC through a radio access network (E-UTRAN) node (eNB 102).

The Mobility Management Entity (MME) 104 manages terminals in idle mode and selects a Packet Data Network (PDN) gateway and serving gateway. The MME 104 performs functions related to roaming and authentication. The MME 104 handles bearer signals generated by the UE 100.

The Serving Gateway 106 acts as a mobility anchor for handover between base stations or movement between 3GPP wireless networks.

The PDN Gateway 108 allocates an IP address to the UE 100, performs functions related to packet data in the core network, and acts as a mobility anchor for movement between 3GPP and non-3GPP wireless networks. The PDN Gateway 108 identifies the bearer bandwidth assigned to a subscriber and performs functions related to packet data forwarding and routing.

The Policy and Charging Rules Function (PCRF) 110 determines policies related to Quality of Service (QoS), billing and the like according to user subscription information and operator policies and applies the determined policies to a corresponding UE.

The IP Multimedia subsystem (IMS) 112 is a network providing voice call services and various multimedia services to users.

The UE 100 has to perform the following procedure to use an emergency call in the EPS.

Step 1. Generation of emergency bearer in EPS
Step 2. Access to IMS network through emergency bearer
Step 3. Performance of IMS emergency registration
Step 4. Attempt to set up IMS emergency session (here, the PCRF provides emergency call policies to the EPS and IMS network)

One or more of Steps 1, 2 and 3 may be skipped if the network allows. In other words, only Steps 2, 3 and 4 may be performed without Step 1. Only Step 4 may be performed without Steps 1, 2 and 3.

Embodiments of the present disclosure described below relate to specific steps and schemes used to deliver user media preference information to the network among the above steps to use an emergency call. Thereafter, a description is given of schemes of the network to utilize the user media preference information.

Embodiment 1

Hereinafter, a description is given of a scheme to deliver user media preference information for an emergency call to the network as a first embodiment of the present disclosure.

To deliver user media preference information for an emergency call to the network, the user selects preferred media at the time of attempting to place an emergency call. Here, the user may select one of one or more media types displayed on the UE 100. The user may also set preferred media in advance for the UE 100.

For the set media preference information to be reflected in the emergency call, the media preference information should be delivered to the PCRF 110. Next, a description is given of two embodiments to deliver media preference information to the PCRF 110.

Embodiment 1-1

As a first scheme to deliver user media preference information for an emergency call to the network, the UE may insert user media preference information as a SIP header in an INVITE message sent for IMS emergency session setup.

Specifically, the UE 100 sends media preference information by inserting user media preference information as a SIP header in an INVITE message that is sent for IMS emergency session setup. According to the present embodiment, media preference information may be inserted as a SIP header or a tag in the INVITE message.

In the present disclosure, a new header "Preferred-Media" is used to represent user media preference information, and a new tag "preferred-media=" is used to represent user media preference information in an existing SIP header. An example of this is shown in FIG. 2.

Figure 2:
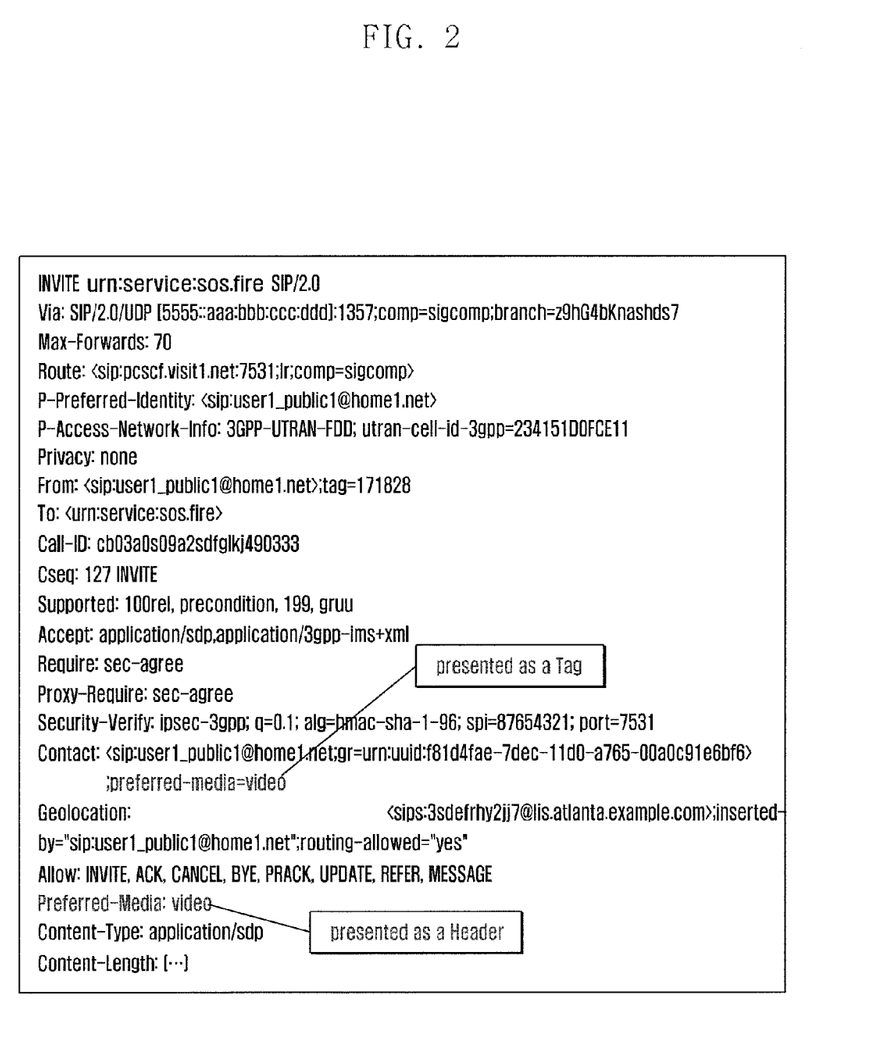
FIG. 2 illustrates an INVITE message serving as an emergency call request in which user media preference information for an emergency call is set to video.

FIG. 2 illustrates an INVITE message serving as an emergency call request in which user media preference information for an emergency call is set to video.

As shown in FIG. 2, the UE 100 may insert a tag "preferred-media=video" or a SIP header "Preferred-Media: video" in the INVITE message.

Figure 3:
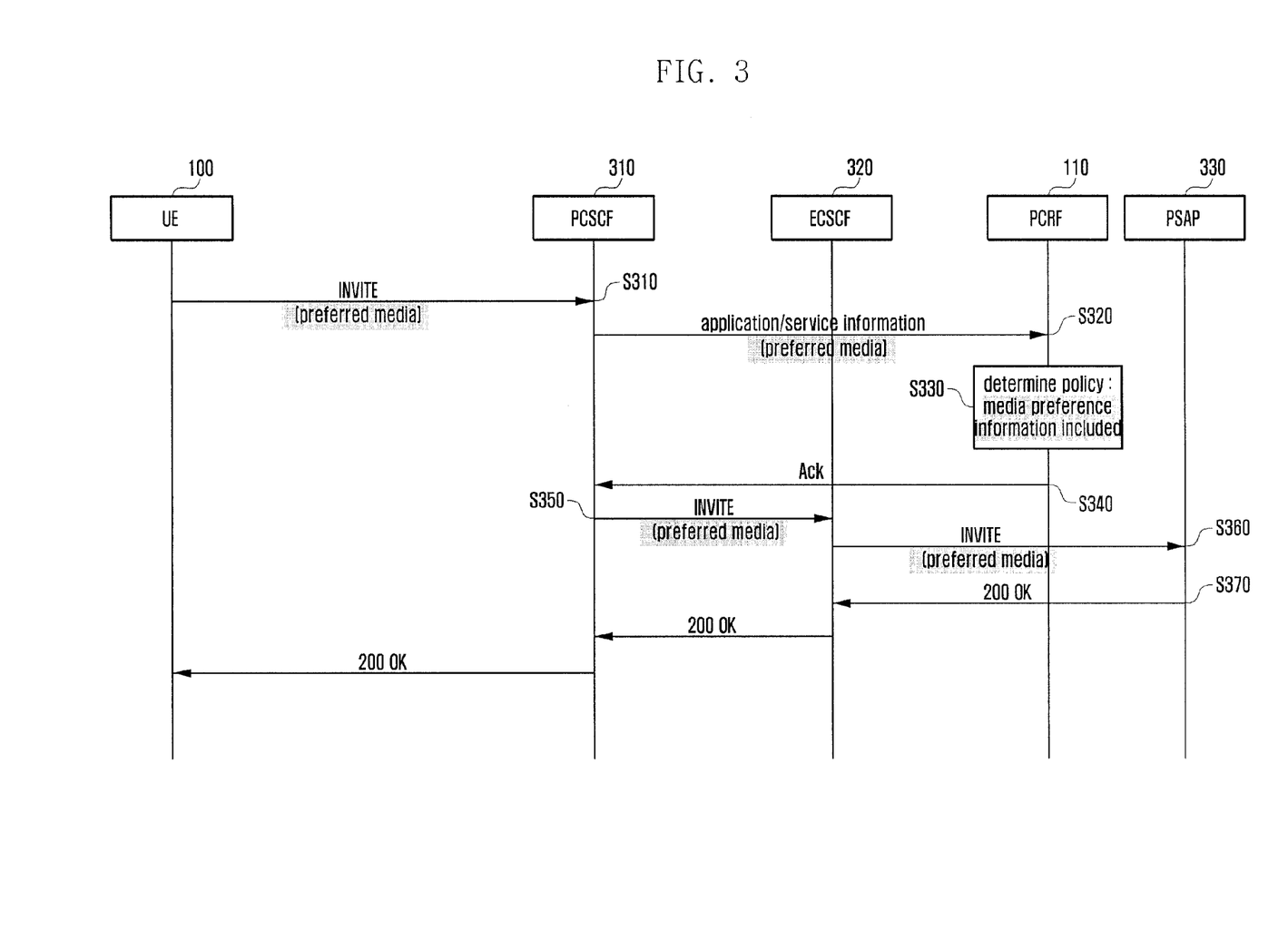
FIG. 3 depicts delivery of user media preference information for an emergency call to the network, in particular, the PCRF 110.

FIG. 3 depicts delivery of user media preference information for an emergency call to the network, in particular, the PCRF 110 according to an embodiment of the present disclosure.

Here, it is assumed that the UE 100 has completed Steps 1 to 3 of the above emergency call procedure.

At operation S310, for IMS emergency session setup, the UE 100 sends an emergency-call-request INVITE message containing user media preference information for an emergency call to the Proxy Call Session Control Function (P-CSCF) 310. The P-CSCF 310 is an initial contact point for a UE connecting to the IMS. To find the P-CSCF 310, the UE 100 may use the DHCP or obtain an address through the PDP context.

At operation S320, the P-CSCF 310 identifies the INVITE message as an emergency message and sends application/service information containing the user media preference information to the PCRF 110.

At operation S330, the PCRF 110 determines a policy for the UE 100 on the basis of collected information. Here, the media preference information sent by the UE 100 may be included in the policy as PCC (policy and charging control) rule information.

Upon acquisition of user media preference information for an emergency call, at operation S340, the PCRF 110 sends an acknowledge message to the P-CSCF 310. Thereafter, at operation S350, the P-CSCF 310 forwards the emergency-call-request INVITE message containing user media preference information to the Emergency Call Session Control Function (E-CSCF) 320. At operation S360, the E-CSCF 320 forwards the INVITE message containing user media preference information to the Public Safety Answering Point (PSAP) 330.

At operation S370, as a reply to the INVITE message, the PSAP 330 sends a 200 OK response message, which is then delivered to the UE 100 through the E-CSCF 320 and the P-CSCF 310.

Operations S320, S330 and S340 may be carried out independently of operations S350, S360 and S370.

Embodiment 1-2

Figure 4:
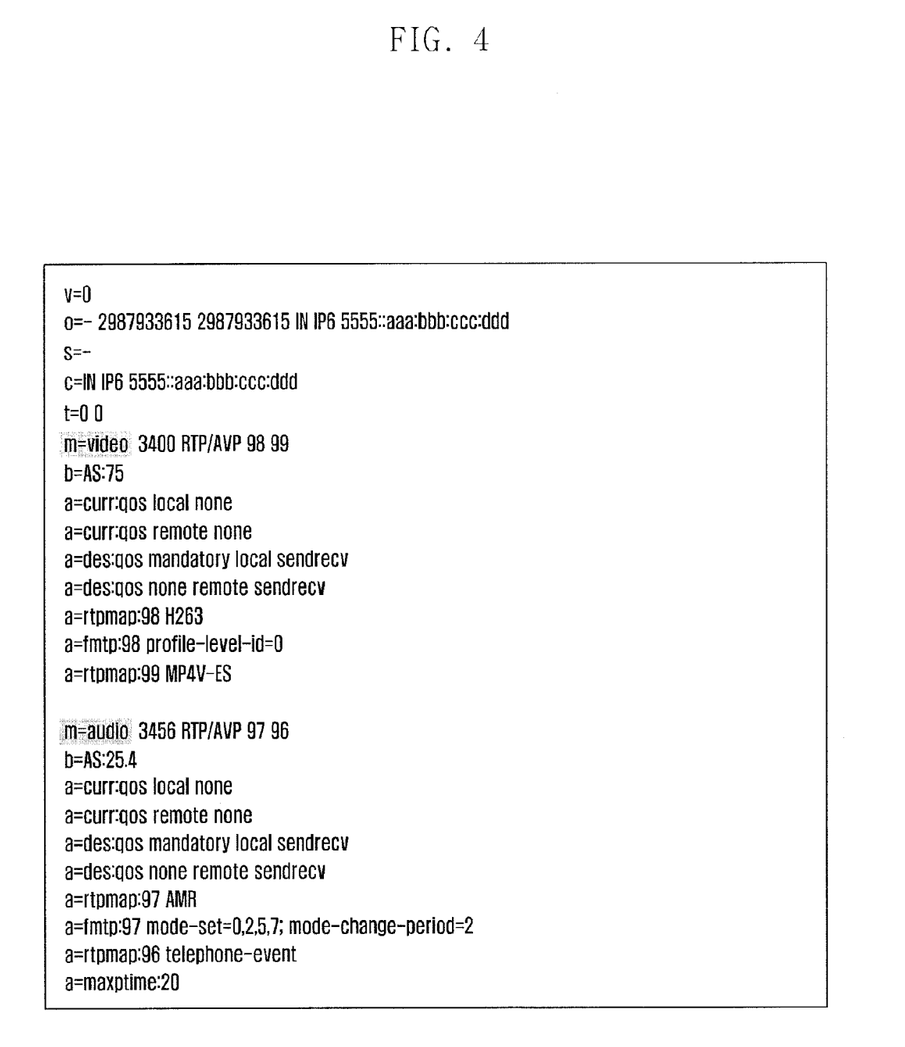
FIG. 4 illustrates an INVITE message serving as an emergency call request in which user media preference information for an emergency call is set to video according to an embodiment of the present disclosure.

As a second scheme to deliver user media preference information for an emergency call to the network, user media preference information may be set in the SDP (Session Description Protocol) description of an INVITE message sent to the IMS network for IMS emergency session setup. The SDP is a protocol used to describe multimedia session parameters. That is, the UE 100 may arrange media descriptions in the SDP description according to user preferences and send the INVITE message to the IMS network. Here, the P-CSCF 310 extracts user media preference information for an emergency call according to the sequence of media descriptions arranged in the SDP description.

More specifically, the UE 100 arranges "m=" fields of the SDP description according to the order of user media preferences in an emergency-call-request INVITE message to be sent for IMS emergency session setup. In existing usage of the SDP, the order of "m=" fields does not indicate user media preferences, and the UE may arrange "m=" fields at random. However, in embodiments of the present disclosure, the order of "m=" fields is interpreted as reflecting user media preferences.

FIG. 4 illustrates an INVITE message serving as an emergency call request in which user media preference information for an emergency call is set to video according to an embodiment of the present disclosure.

Figure 5:
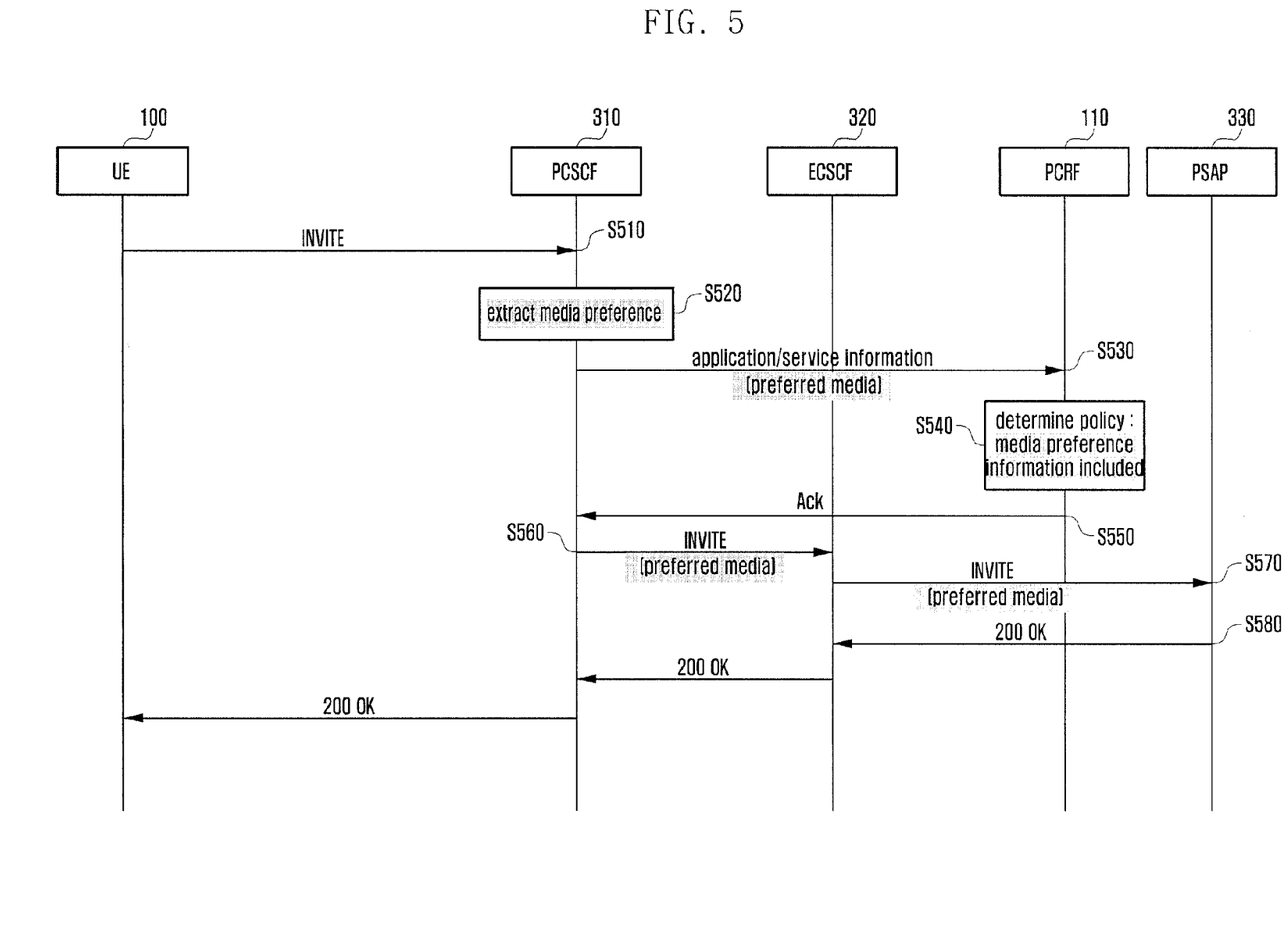
FIG. 5 is a sequence diagram depicting delivery of user media preference information sent by a user equipment 100 to the PCRF according to another embodiment of the present disclosure.

FIG. 5 is a sequence diagram depicting delivery of user media preference information sent by the UE 100 to the PCRF according to another embodiment of the present disclosure.

The procedure for delivering media preference information depicted in FIG. 5 differs from the procedure depicted in FIG. 3 in that the P-CSCF 310 extracts media preference information from an emergency-call-request INVITE message sent by the UE 100 at operation S520.

The P-CSCF 310 identifies the received INVITE message as a message for an emergency call and extracts media preference information in consideration of the order of media descriptions arranged in the SDP description. The extracted information is delivered to the PCRF 110. As subsequent operations are the same as those of FIG. 3, a detailed description thereof is omitted.

Embodiment 2

Hereinafter, a description is given of a scheme for the PCRF 110 to deliver user media preference information to the EPS network.

The PCRF 110 may directly convert user media preference information into a value usable in the EPS network and send the value to the MME 104, or the PGW 108 may convert user media preference information into a new indicator to be used in the network and send the indicator to the MME 104. These are described below as separate embodiments.

Meanwhile, when normal bearers are present in addition to emergency bearers, the MME 104 may release the normal bearers using a received value or indicator.

Embodiment 2-1

Hereinafter, a description is given of an embodiment wherein the PCRF 110 directly converts user media preference information into a value usable in the EPS network and sends the value to the MME 104.

The PCRF 110 converts user media preference information for an emergency call received from the UE 100 into bearer level QoS values according to the operator policy. Here, the bearer level QoS values are associated with allocation and retention priority (ARP), QoS class identifier (QCI), maximum bit rate for uplink, maximum bit rate for downlink, guaranteed bit rate for uplink, and guaranteed bit rate for downlink. The PCRF 110 configures user preferred media using one or more of these values.

The bearer level QoS values are sent from the PCRF 110 to the PGW 108 through an IP-CAN cession modification request message, and the PGW 108 sends a Create Bearer Request message containing the bearer level QoS values to the MME 104. This procedure is depicted in detail in FIG. 6. Messages different from the messages named above may be used.

Figure 6:
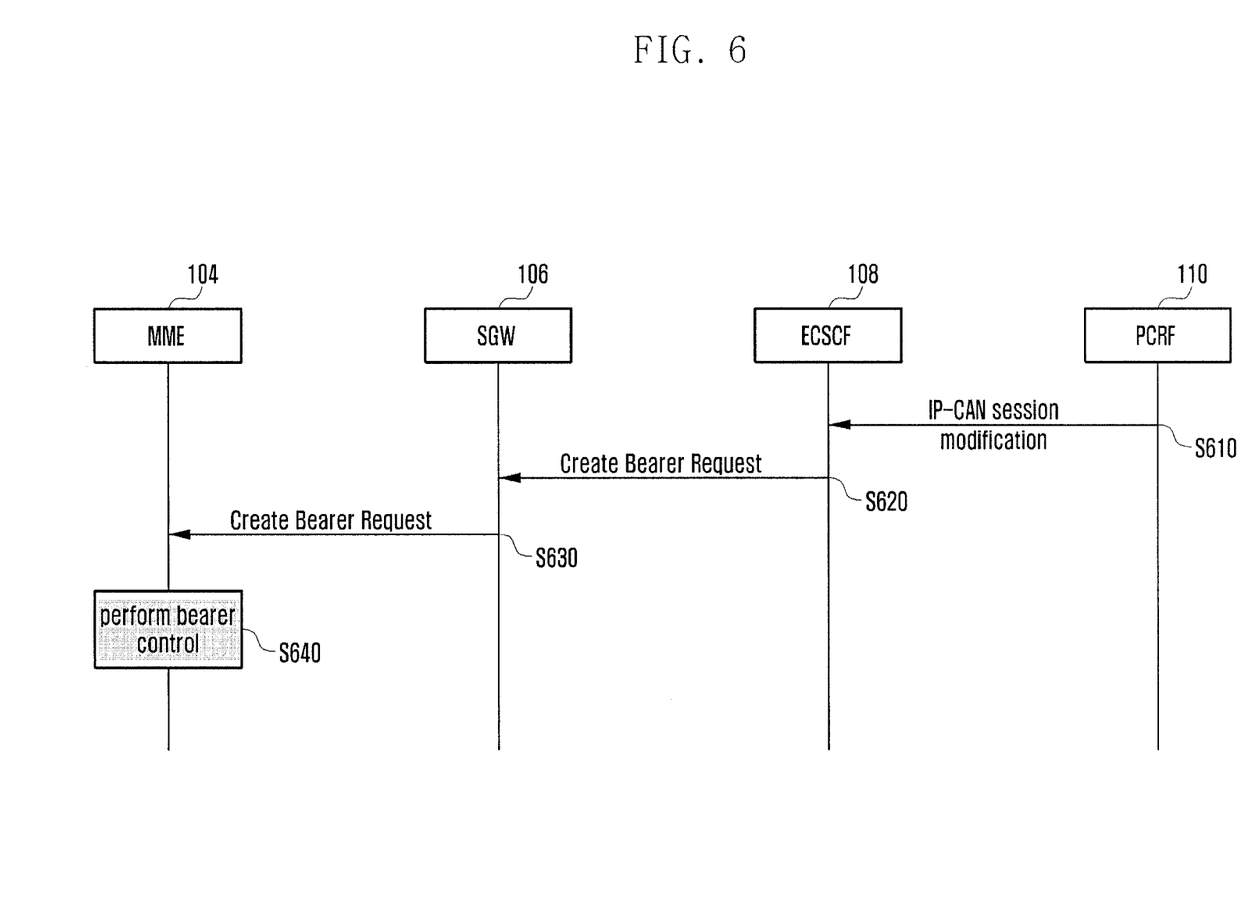
FIG. 6 is a sequence diagram depicting delivery of QoS values from the PCRF 110 to the MME 104 according to an embodiment of the present disclosure.

FIG. 6 is a sequence diagram depicting delivery of QoS values from the PCRF 110 to the MME 104 according to an embodiment of the present disclosure. It should be noted that messages not used for delivery of user media preference information are omitted in FIG. 6.

First, the PCRF 110 converts media preference information received from the UE 100 into bearer level QoS values according to the operator policy. At operation S610, the PCRF 110 sends an IP-CAN session modification message containing the bearer level QoS values to the PGW 108.

At operation S620, the PGW 108 sends a Create Bearer Request message whose bearer context contains the bearer level QoS values to the SGW 106. At operation S630, the SGW 106 forwards the Create Bearer Request message to the MME 104. At operation S640, the MME 104 performs bearer control using the received bearer level QoS values.

Figure 7:
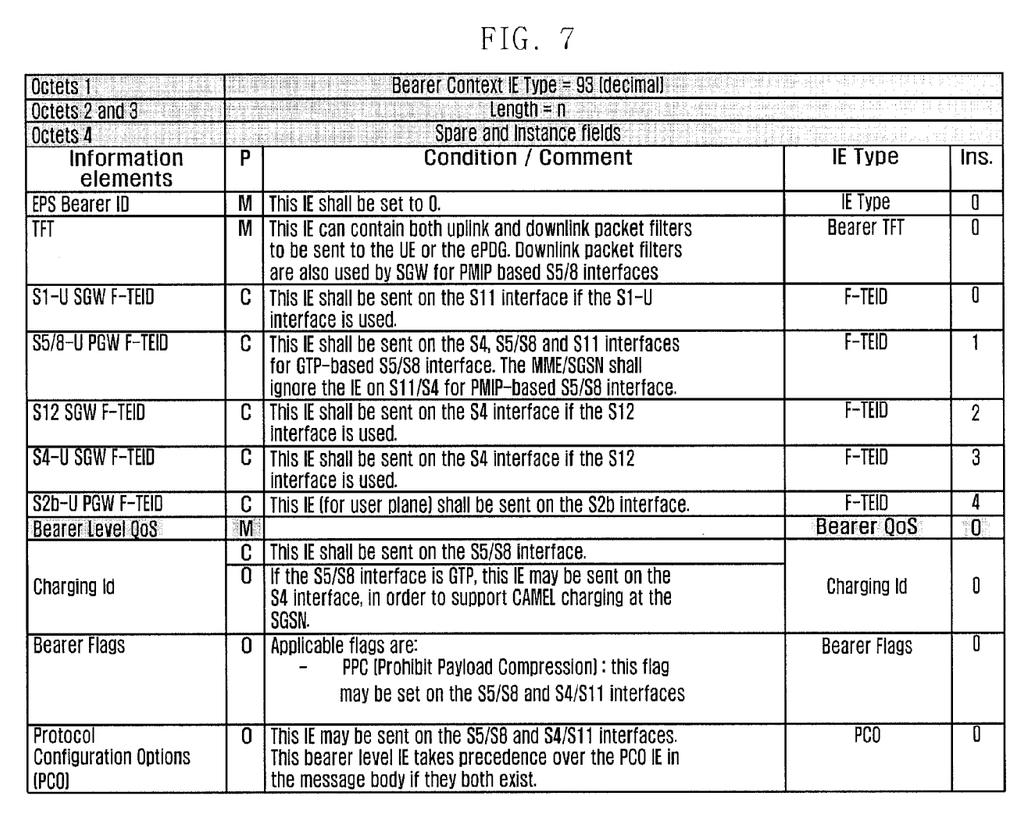
FIG. 7 illustrates fields constituting a bearer context according to an embodiment of the present disclosure.

FIG. 7 illustrates fields constituting the bearer context according to an embodiment of the present disclosure.

As shown in FIG. 7, the Bear Level QoS field may be set according to the QoS values converted by the PCRF 110.

Embodiment 2-2

Hereinafter, the PCRF 110 sends user media preference information or corresponding bearer level QoS values to the PGW 108, and the PGW 108 converts the received information or values into a new indicator indicating the emergency bearer media preference. In the present embodiment, the new indicator is referred to as emergency media preference. The converted indicator is contained in a Create Bearer Request message and is sent to the MME 104.

More specifically, referring to FIG. 6, at operation S610, the PCRF 110 sends an IP-CAN session modification message containing user media preference information or corresponding bearer level QoS values to the PGW 108.

At operation S620, the PGW 108 converts the received information or values into an emergency media preference indicator and sends a Create Bearer Request message containing the emergency media preference indicator to the MME 104 via the SGW 106.

Fields constituting a bearer context according to the present embodiment are illustrated in FIG. 8.

As shown in FIG. 8, the emergency media preference field is newly added to the bearer context according to the present embodiment.

Embodiment 3

Hereinafter, a description is given of a scheme for the MME 104 to use received media preference information for handover.

The MME 104 keeps user media preference information received from the PCRF or PGW as bearer level QoS values or emergency media preference indicator. In other words, the MME 104 stores user media preference information in a corresponding context. The MME may control handover of the UE (in particular, handover for an emergency call) by use of the context containing user media preference information. Although bearers with the same characteristics are used, the MME may selectively perform handover through distinction between media information provided by the bearers on the basis of the context containing user media preference information. For example, when multiple bearers with QCI 1 are present, handover may be applied only to a bearer whose media preference information has the highest priority according to states of the target network.

At handover of the UE 100, the context may be transferred from the source network to the target network and may be used by the target network to determine handover priority. Alternatively, the source network may determine handover priority on the basis of the context and only a bearer supported by the target network may be handed over.

To be more specific thereto,

1) For handover of a UE, the target MME receives a context associated with the UE from the source MME. The context has media preference information and information on currently used bearers. When the target MME cannot support all the bearers used in the source MME, it selects bearers to be handed over according to the media preference information. The target MME sends information on supportable bearers to the source MME. The source MME hands over only the indicated bearers.

2) Alternatively, the source MME hands over all bearers in service to the target MME. Here, the source MME also transfers the context associated with the UE to the target MME. The context has media preference information and information on currently used bearers. When the target MME cannot support all the bearers used in the source MME, it drops bearers other than preferred bearers among all the bearers handed over according to the media preference information.

Hereinabove, various embodiments of the present disclosure has been shown and described for the purpose of illustration without limiting the subject matter of the present disclosure. It should be understood by those skilled in the art that many variations and modifications of the method and apparatus described herein will still fall within the spirit and scope of the present disclosure as defined in the appended claims and their equivalents.

The invention claimed is:

1. A method for transmitting media preference information associated with an emergency call by a user equipment (UE) in a mobile communication system, the method comprising:
    sending an emergency call request message including media preference information of a user associated with an emergency call to a proxy call session control function (P-CSCF); and
    receiving a response message corresponding to the emergency call request message from the P-CSCF,
    wherein a policy to be used for controlling the UE is determined by a policy and charging rule function (PCRF) based on the media preference information,
    wherein the media preference information is transferred from the PCRF to a mobility management entity (MME), and
    wherein the media preference information is converted into a value to be used in a network by the PCRF, or the media preference information is converted into an indicator to be used in the network by a packet data network (PDN) Gateway.

2. The method of claim 1, wherein the sending of the emergency call request message comprises transmitting an INVITE message including the media preference information.

3. The method of claim 2, wherein the INVITE message comprises a session initiation protocol (SIP) header or tag including the media preference information.

4. The method of claim 1, wherein the sending of the emergency call request message comprises transmitting an INVITE message whose session description protocol (SDP) description including media descriptions arranged according to the media preference information.

5. A method for processing media preference information associated with an emergency call by a policy and charging rule function (PCRF) in a mobile communication system, the method comprising:
    receiving application service information including the media preference information from a proxy call session control function (P-CSCF), the media preference information is transferred from a user equipment (UE) to the P-CSCF;
    determining a policy to be used for controlling the UE on the basis of the media preference information; and
    sending the media preference information to a mobility management entity (MME),
    wherein the media preference information is converted into a value to be used in a network by the PCRF, or the media preference information is converted into an indicator to be used in the network by a packet data network (PDN) Gateway.

6. The method of claim 5, further comprising:
    receiving application service information including extracted media preference information from the P-CSCF,
    wherein the media preference information is extracted from a INVITE message in consideration of the sequence of media descriptions in the INVITE message by the P-CSCF, the INVITE message is received from the UE.

7. The method of claim 5, wherein the sending of the media preference information to the MME comprises:
    converting the media preference information into a bearer level QoS value; and sending the bearer level QoS value to the PDN Gateway,
wherein the PDN Gateway sends a Create Bearer Request message including the bearer level QoS value to the MME.

8. The method of claim 5, wherein the sending of the media preference information to the MME comprises:
sending the media preference information or a bearer level QoS value corresponding to the media preference information to the PDN Gateway,
wherein the PDN Gateway converts the bearer level QoS value into the indicator indicating emergency bearer media preference information, and
wherein the PDN Gateway sends a Create Bearer Request message including the indicator to the MME.

9. The method of claim 5,
wherein the MME controls handover of the UE by use of the media preference information.

10. A user equipment (UE) for transmitting media preference information associated with an emergency call in a mobile communication system, the UE comprising:
a transceiver for transmitting and receiving a signal; and
a controller for sending an emergency call request message including media preference information of a user associated with an emergency call to a proxy call session control function (P-CSCF), and receiving a response message corresponding to the emergency call request message from the P-CSCF,
wherein a policy to be used for controlling the UE is determined by a policy and charging rule function (PCRF) based on the media preference information,
wherein the media preference information is transferred from the PCRF to a mobility management entity (MME), and
wherein the media preference information is converted into a value to be used in a network by the PCRF, or the media preference information is converted into an indicator to be used in the network by a packet data network (PDN) Gateway.

11. The UE of claim 10, wherein the UE transmits an INVITE message including the media preference information.

12. The UE of claim 11, wherein the INVITE message comprises a session initiation protocol (SIP) header or tag including the media preference information.

13. The UE of claim 10, wherein the UE transmits an INVITE message whose session description protocol (SDP) description includes media descriptions arranged according to the media preference information.

14. A policy and charging rule function (PCRF) for processing media preference information associated with an emergency call in a mobile communication system, the PCRF comprising:
a transceiver for transmitting and receiving a signal; and
a controller for receiving application service information including media preference information from a proxy call session control function (P-CSCF), determining a policy to be used for controlling a user equipment (UE) on the basis of the media preference information and sending the media preference information to a mobility management entity (MME),
wherein the media preference information is transferred from the UE to the P-CSCF, and
wherein the media preference information is converted into a value to be used in a network by the PCRF, or the media preference information is converted into an indicator to be used in the network by a packet data network (PDN) Gateway.

15. The PCRF of claim 14,
wherein the PCRF receives the application service information including extracted media preference information from the P-CSCF, and
wherein the media preference information is extracted from a INVITE message in consideration of the sequence of media descriptions in the INVITE message by the P-CSCF, the INVITE message is received from the UE.

16. The PCRF of claim 14,
wherein the PCRF sends a bearer level QoS value corresponding to the media preference information to the PDN Gateway, and
wherein the PDN Gateway sends a Create Bearer Request message including the bearer level QoS value to the MME.

17. The PCRF of claim 14,
wherein the MME controls handover of the UE by use of the media preference information.

\* \* \* \* \*